(No Model.)
J. HERRBURGER.
DAMPER FOR UPRIGHT PIANOS.
No. 350,625. Patented Oct. 12, 1886.
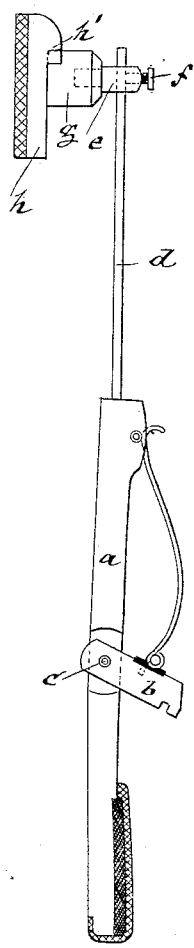
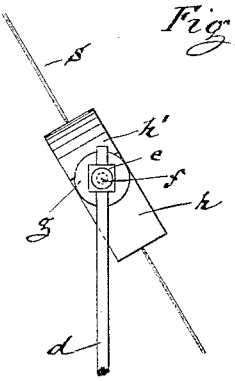
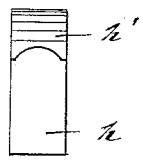
Witnesses.
Inventor.

UNITED STATES PATENT OFFICE.

JOSEPH HERRBURGER, OF PARIS, FRANCE.

DAMPER FOR UPRIGHT PIANOS.

SPECIFICATION forming part of Letters Patent No. 350,625, dated October 12, 1886.

Application filed June 4, 1886. Serial No. 204,113. (No model.)

*To all whom it may concern:*

Be it known that I, JOSEPH HERRBURGER, of Paris, France, but temporarily a resident of the city of New York, county and State of New York, have invented a new and Improved Damper for Upright-Piano Actions, of which the following specification is a full, clear, and exact description.

This invention relates to a damper so constructed that the block need not be bored for the reception of the damper-wire, and is therefore not liable to be split. The damper is also so constructed that the head may be readily glued to the block at any desired angle to the wire, so as to be in proper position above the string.

The invention consists in the various features of improvement hereinafter more fully pointed out.

In the accompanying drawings, Figure I is a side view, and Fig. II a top view, of my improved damper. Fig. III is a face view of the damper-head.

The letter $a$ represents the damper-lever attached to hammer-rail by flange $b$, pivoted at $c$, the lever carrying the damper-wire $d$, all as usual.

The damper proper consists of three parts—a block, $g$, a stud, $e$, and a head, $h$. The block $g$ is made of wood, and is of cylindrical shape. A mortise made in one of its ends receives one end of the outwardly-projecting stud $e$. This stud is made of metal, and is preferably of square shape in cross-section. A transverse perforation in stud $e$ receives the end of wire $d$, to which the stud is secured by means of a clamp-screw, $f$, passing through a threaded longitudinal bore of the stud. The head $h$ of the damper is cushioned, as usual, and is provided with a hook or projection, $h'$, having a curved inner edge, Fig. III, that bears and fits against the cylindrical block $g$, the curvature of hook $h'$ corresponding to the curvature of the block $g$. It will be seen that the head $h$ may be glued to block $g$ at any inclination to the wire $d$, thus bringing the damper in proper position over string $s$, Fig. II, the rounded edge of the hook $h'$ properly engaging at all times the circumference of the block. Moreover, this damper is not apt to split, as the wooden damper-block is not bored for the reception of wire $d$.

I claim as my invention—

The combination of head $h$, having hook $h'$, curved at its inner edge, with cylindrical block $g$, and with perforated stud $e$ and clamp-screw $f$, substantially as specified.

J. HERRBURGER.

Witnesses:
F. V. BRIESEN,
R. H. ROY.